United States Patent
Nimmagadda et al.

(10) Patent No.: US 10,645,121 B1
(45) Date of Patent: May 5, 2020

(54) NETWORK TRAFFIC MANAGEMENT BASED ON NETWORK ENTITY ATTRIBUTES

(71) Applicant: Juniper Networks, Inc., Sunnyvale, CA (US)

(72) Inventors: Srinivas Nimmagadda, San Jose, CA (US); Rakesh Manocha, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

(21) Appl. No.: 15/838,232

(22) Filed: Dec. 11, 2017

(51) Int. Cl.
*H04L 29/06* (2006.01)
*H04L 12/24* (2006.01)

(52) U.S. Cl.
CPC .......... *H04L 63/20* (2013.01); *H04L 63/0263* (2013.01); *H04L 41/22* (2013.01); *H04L 63/1433* (2013.01)

(58) Field of Classification Search
CPC . H04L 63/20; H04L 63/0263; H04L 63/1433; H04L 41/22
See application file for complete search history.

(56) References Cited

U.S. PATENT DOCUMENTS

| | | | | |
|---|---|---|---|---|
| 6,484,261 B1 * | 11/2002 | Wiegel | ................ | H04L 41/0856 715/763 |
| 6,917,596 B1 * | 7/2005 | Wight | ..................... | H04L 41/12 370/254 |
| 7,146,639 B2 * | 12/2006 | Bartal | ................ | H04L 41/0893 726/11 |
| 8,607,300 B2 * | 12/2013 | Wang | ...................... | H04L 63/20 726/1 |
| 9,680,875 B2 * | 6/2017 | Knjazihhin | ............. | H04L 63/20 |
| 2002/0154606 A1 * | 10/2002 | Duncan | ................. | H04L 12/462 370/256 |
| 2004/0117624 A1 * | 6/2004 | Brandt | ............... | H04L 63/1408 713/166 |
| 2006/0090208 A1 * | 4/2006 | Smith | .................. | G06F 21/604 726/26 |
| 2006/0177063 A1 * | 8/2006 | Conway | .................. | H04L 63/02 380/270 |
| 2007/0189307 A1 * | 8/2007 | Overby, Jr. | ............. | H04L 63/20 370/395.52 |
| 2014/0029031 A1 * | 1/2014 | Landwehr | ............. | G06F 3/1222 358/1.13 |
| 2014/0075519 A1 * | 3/2014 | Porras | .................. | H04L 63/107 726/4 |
| 2015/0033285 A1 * | 1/2015 | Gao | ..................... | H04L 63/0263 726/1 |

* cited by examiner

*Primary Examiner* — Chau Le
*Assistant Examiner* — Hany S. Gadall
(74) *Attorney, Agent, or Firm* — Harrity & Harrity, LLP

(57) ABSTRACT

A device may include one or more input components and one or more processors to: receive network entity data for a network entities operating on a network, the network entity data indicating network entity attributes associated with the network entities. The device may generate a map of the network entities based on the network entity data, the map of the network entities defining, for each network entity included in the map of the plurality of network entities, a relationship between the network entity and at least one other network entity included in the plurality of network entities. In addition, the device may identify a network entity relationship rule based on the map of the network entities and perform an action based on the network entity relationship rule.

20 Claims, 6 Drawing Sheets

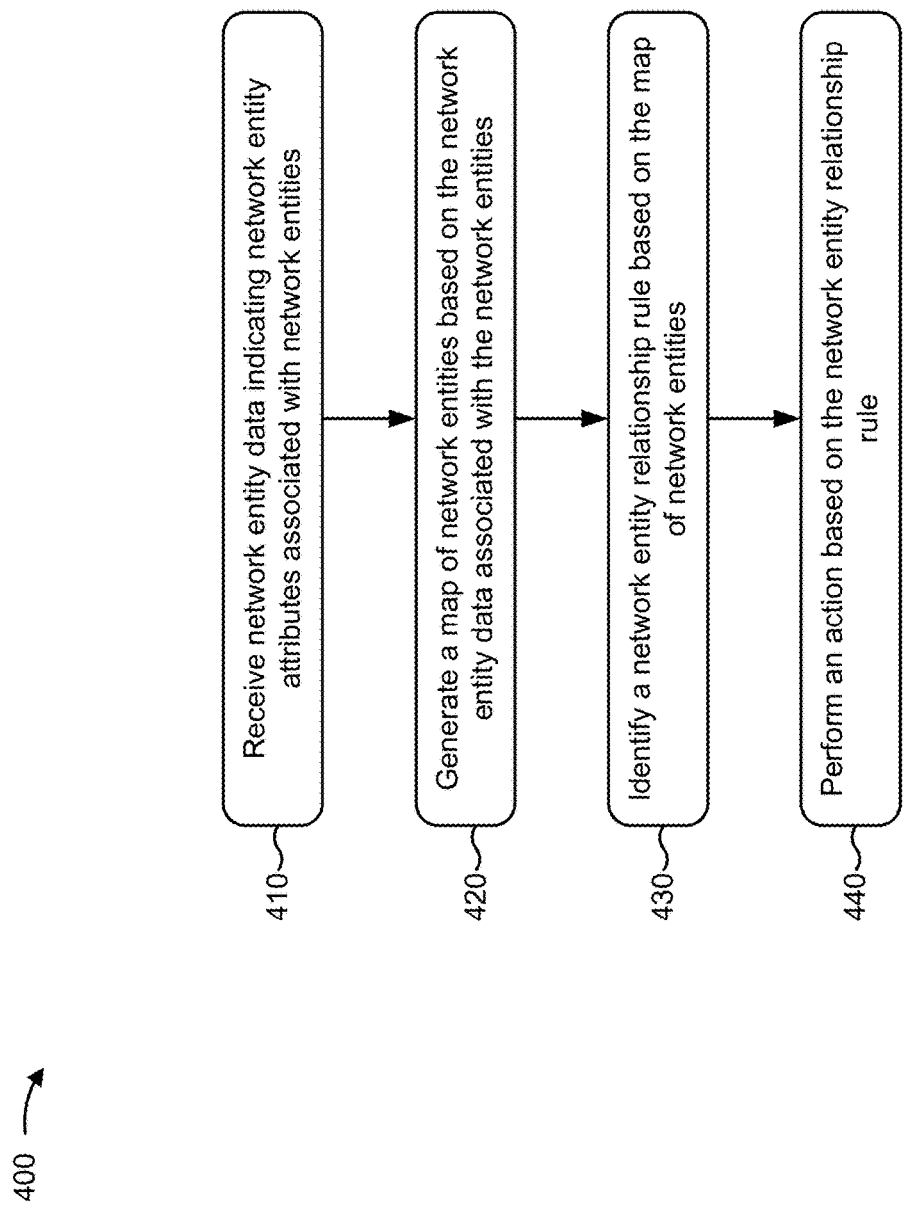

NETWORK TRAFFIC MANAGEMENT BASED ON NETWORK ENTITY ATTRIBUTES

BACKGROUND

Network devices, such as routers, switches, firewalls, or the like, often handle network traffic in the form of network packets (e.g., data packets) that are transmitted between network entities (e.g., devices operating on a network). In some situations, network devices may implement security rules designed to protect various network entities from a variety of potential threats, such as malware, hacking attempts, denial of service attacks, unauthorized access, or the like. Security rules often cause network devices to inspect network traffic, including individual network packets, to determine whether potential threats exist and, if so, how the network packets should be handled.

SUMMARY

In some aspects, a device may include one or more input components; and one or more processors to: receive, via at least one of the one or more input components, network entity data for a plurality of network entities operating on a network, the network entity data indicating network entity attributes associated with the plurality of network entities; generate a map of the plurality of network entities based on the network entity data, the map of the plurality of network entities defining, for each network entity included in the map of the plurality of network entities, a relationship between the network entity and at least one other network entity included in the plurality of network entities; identify a network entity relationship rule based on the map of the plurality of network entities; and perform an action based on the network entity relationship rule.

In some aspects, a non-transitory computer-readable medium may store instructions, the instructions comprising: one or more instructions that, when executed by one or more processors, cause the one or more processors to: receive network entity data for a plurality of network entities operating on a network, the network entity data indicating network entity attributes associated with the plurality of network entities; generate a map of the plurality of network entities based on the network entity data, the map of the plurality of network entities defining, for each network entity included in the map of the plurality of network entities, a relationship between the network entity and at least one other network entity included in the plurality of network entities; identify a network entity relationship rule based on the map of the plurality of network entities; generate, based on the network entity relationship rule, a plurality of security rules, each of the plurality of security rules specifying at least one of the plurality of network entities; and provide the plurality of security rules to a network device operating on the network.

In some aspects, a method comprises: receiving, by a network management device, network entity data for a plurality of network entities operating on a network, the network entity data indicating network entity attributes associated with the plurality of network entities; generating, by the network management device, a map of the plurality of network entities based on the network entity data, the map of the plurality of network entities defining, for each network entity included in the map of the plurality of network entities, a relationship between the network entity and at least one other network entity included in the plurality of network entities; identifying, by the network management device, a network entity relationship rule based on the map of the plurality of network entities; generating, by the network management device and based on the network entity relationship rule, at least one security rule, each of the at least one security rule specifying a firewall rule applicable to at least one of the plurality of network entities; and providing, by the network management device, the at least one security rule to a network firewall device operating on the network.

BRIEF DESCRIPTION OF THE DRAWINGS

FIG. 4 is a flow chart of an example process for managing network traffic based on network entity attributes.

DETAILED DESCRIPTION

Figure 1A:
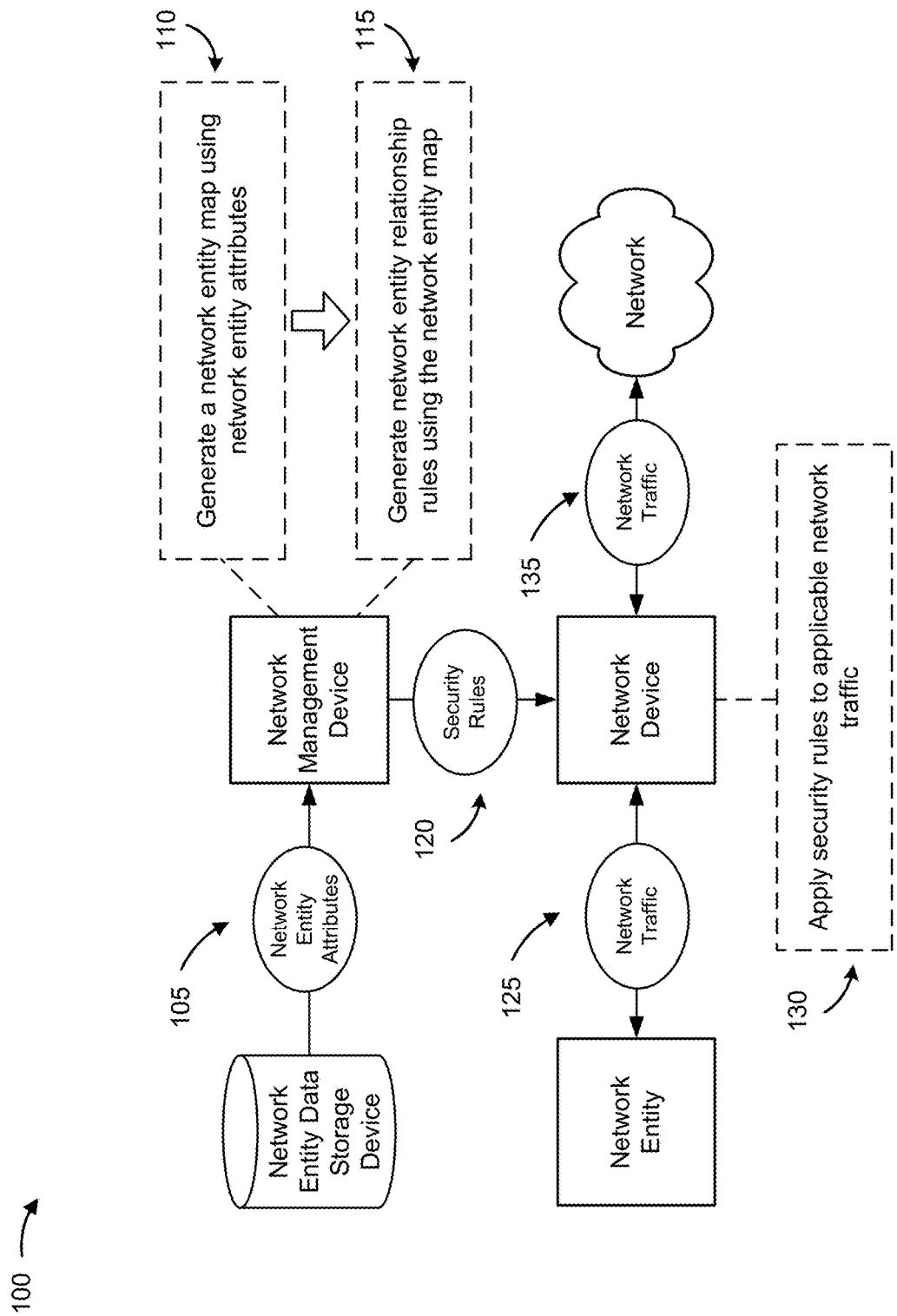
FIGS. 1A and 1B are diagrams of an overview of an example implementation described herein.

The following detailed description of example implementations refers to the accompanying drawings. The same reference numbers in different drawings may identify the same or similar elements.

Network devices, such as switches, routers, firewalls, or the like, often use security rules to filter or otherwise take action on network packets that are handled by the network devices in the course of forwarding and/or routing the network packets to their intended destination. The security rules are typically created by network administrators and often include a large quantity of rules to be applied, especially as the number of network entities (e.g., hardware devices and software applications operating on a network) and/or security policies increase. The security rules may be implemented, for example, in a table that is processed top-down by a network device, with the first matching security rule being processed. Due to the manner in which security rules are often implemented, the tables that include the security rules may become very large and difficult for an administrator to understand and/or manage. By way of example, a large network deployment, such as a wide area network, large local area network, and/or cloud computing network, may include thousands of network entities, such as applications deployed in data centers, and each application may be associated with multiple network entities, including application components, such as web servers, reporting servers, databases, or the like. The number of security rules that might be applicable in this example situation may be difficult to manage and/or understand, which may result in potential flaws in network security and/or inefficient network management.

Some implementations, described herein, provide a network management device that is capable of using network entity attributes (e.g., attributes indicating various aspects of software and/or hardware devices operating on a network) to generate a network entity map that can be used to create network entity relationship rules ("network rules") that are relatively simple to understand and that can be easily converted to security rules (e.g., rules that may be applied by network devices, such as firewall rules that may be applied by a firewall) and applied to various network devices capable of implementing the security rules on network traffic to and from network entities operating on the network. For example, the network management device may, using network entity attributes, generate a network entity map that identifies relationships between network entities associated with a network managed by the network management device. Using the relationships identified in the network entity map, the network management device may enable the creation of network rules that are based on the relationships between network entities. The network rules may then be converted to security rules that may be provided to the appropriate network devices for implementing the security rules on network traffic through the network managed by the network management device.

In this way, the ability for a network management device to generate a network entity map and enable creation of network rules may greatly simplify the understanding of security rules in use by network devices and greatly reduce the number of security rules that are manually entered and managed. In addition, network rules may automatically handle security rule updates and changes in situations where network entities change (e.g., the addition and/or removal of a network entity from the network), as network rules may be defined to automatically include or exclude network entities that are added or removed based on their network attributes and relationships with other network entities. Furthermore, changes to a large number of security rules may be implemented by changing a single network rule. Resources, including computing resources and human administrator resources, may be conserved by using a network management device such as the one described herein, e.g., by reducing the amount of time, power, processing resources, memory resources, and/or the like, which might otherwise be used when a network administrator manually manages security rules.

As used herein, a network packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Figure 1B:
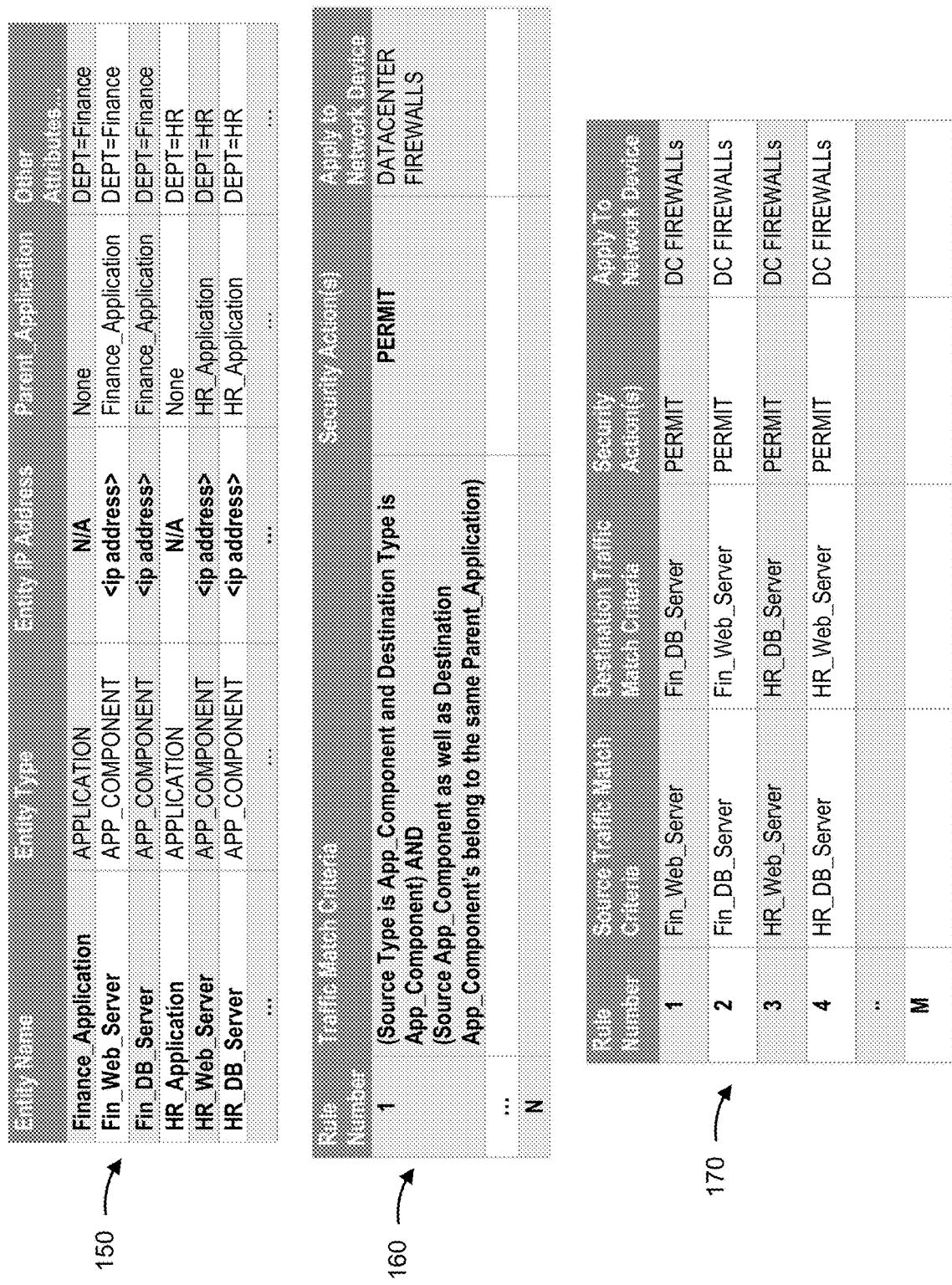

FIGS. 1A and 1B are diagrams of an overview of an example implementation 100 described herein. As shown in FIG. 1A, example implementation 100 may include a network entity data storage device (e.g., a data storage device that includes a variety of attributes related to a network entity), a network management device (e.g., a server computer or other device capable of communicating with a network device to establish security rules applicable to a network), a network entity (e.g., a software application or device that communicates with other devices via a network, such as a server computer, personal computer, Internet of Things (IoT) device, or the like), a network device (e.g., a router, switch, firewall, or another device designed to handle network traffic), and a network (e.g., a wide area network (WAN), local area network (LAN), or the like).

As shown in FIG. 1A, and by reference number 105, the network management device receives network entity attributes from the network entity data storage device. The network entity attributes may identify a variety of things relevant to the network entity (and other network entities associated with the network), such as a description of the network entity, a network entity type, an application to which the network entity may be applicable, a network address of the network entity, a parent application applicable to the network entity (e.g., a software application with which the network entity is associated), a department associated with the network entity, or the like.

As further shown in FIG. 1A, and by reference number 110, the network management device generates a network entity map using the network entity attributes. The network entity map defines relationships between network entities operating on a network. For example, a network entity attribute may specify that the network entity is a component of an application operating on the network (e.g., a device that stores and/or executes all or a portion of the application). Accordingly, the network entity may be related to other network entities based on the application and/or the network entity's status as a component of the application. In this situation, the network entity map may indicate that the network entity is related to (e.g., mapped to) other network entities that are also application components (e.g., the relationship being that the mapped network entities are all application components). As another example, the network entity map may indicate that the network entity is related to other network entities that are application components of the same application (e.g., the relationship being that the mapped network entities are all application components of the same application). Many other relationships may be defined by the network entity map, which may also depend on which network attributes are available and applicable to the network entities included in the network entity map.

As further shown in FIG. 1A, and by reference number 115, the network management device generates network entity relationship rules (network rules) using the network entity map. The network rules may be generated automatically (e.g., based on shared features, default rules, or the like) and/or generated based on input provided by a network administrator in communication with the network management device. Network rules may define actions to be taken on network traffic based on the relationships between network entities associated with the traffic. For example, a network rule may state that network traffic should be permitted (e.g., not blocked) between network entities that are components of the same application. In some implementations, network rules may include other criteria for determining whether network traffic should be acted upon (e.g., criteria other than a relationship between network entities).

As further shown in FIG. 1A, and by reference number 120, the network management device provides the network device with security rules. In some implementations, the network management device translates the network rules into security rules prior to providing the security rules to the network device and, in some implementations, the network management device may provide network rules to the network device, enabling the network device to translate the network rules into security rules or operate on the network rules. The network rules may be translated to security rules, for example, using the network entity map. Using the example network rule above (permitting network traffic between network entities that are components of the same application), the network management device may generate, for each network entity that is an application component, a number of security rules equal to twice the number of other application components that are components of the same application (e.g., bi-directional security rules that permit network traffic between each of the application components).

As further shown in FIG. 1A, and by reference number 125, the network device receives network traffic from the network entity. As shown by reference number 130, the network device applies security rules to the applicable network traffic. For example, the network device may go through security rules to identify security rules with matching conditions that match the network traffic (e.g., in the example, above, network traffic between two application components of the same application may match a security rule derived from the network rules). Any security rules that might apply to the network traffic may be applied by the network device. As shown by reference number 135, in the example implementation, the network traffic sent by the network entity was permitted to proceed to the network after application of security rules by the network device. For example, after determining that the source and destination of the network traffic were both application components of the same application (for which security rules were generated), the network device may permit the network traffic.

FIG. 1B depicts example network entity attributes 150, network rules 160, and security rules 170 that may be used by the network management system and/or network device to manage network traffic using relationships between network entities (e.g., as discussed with respect to example implementation 100 of FIG. 1A). For example, the example network entity attributes 150 include various attributes for two applications (e.g., Finance_Application and HR_Application), and attributes for four application components (e.g., Fin_Web_Server, Fin_DB_Server, HR_Web_Server, and HR_DB_Server). The network entity attributes identify the type of network entity (e.g., APPLICATION, or APP_COMPONENT in this example), an internet protocol address of the network entity (if applicable), a parent application (if applicable), and a department.

The example network rules 160 (e.g., rules 1 through N) depict an example rule generated based on the relationships between network entities. As noted above, and described in further detail below, these rules may have been generated automatically or based on administrator input. Example rule 1 indicates that network traffic should be permitted in a situation where both the source and destination of the network traffic are application components (e.g., network entity type APP_COMPONENT) and the source and destination of the network traffic belong to the same parent application. Additionally, in this example, the network rule indicates that the rule should be applied to datacenter firewalls.

The example security rules 170 (e.g., rules 1 through M) depict example security rules generated based on the network rule (e.g., network rule 1, above). The first security rule indicates, for example, that network traffic should be permitted at datacenter firewalls where the source of the network traffic is Fin_Web_Server and the destination of the network traffic is Fin_DB_Server. The second security rule indicates that network traffic should be permitted at datacenter firewalls where the source of the network traffic is Fin_DB_Server and the destination of the network traffic is Fin_Web_Server. The foregoing security rules may be generated, for example, because both Fin_DB_Server and Fin_Web_Server are application components, and Fin_DB_Server and Fin_Web_Server both belong to the same parent application (e.g., Finance_Application), as indicated in the network entity attributes 150. Similarly, the third security rule indicates that network traffic should be permitted at datacenter firewalls where the source of the network traffic is HR_Web_Server and the destination of the network traffic is HR_DB_Server. The fourth security rule indicates that network traffic should be permitted at datacenter firewalls where the source of the network traffic is HR_DB_Server and the destination of the network traffic is HR_Web_Server. The third and fourth security rules may also have been generated based on the example network rule and the network entity attributes, which indicate that HR_DB_Server and HR_Web_Server are application components that belong to the same parent application (e.g., HR_Application). In this example, four security rules were generated based on a single network rule and the entity attributes.

In this way, the ability for a network management device to generate a network entity map and enable creation of network rules may greatly simplify the understanding of security rules in use by network devices and greatly reduce the number of security rules that are manually entered and managed. In addition, network rules may automatically handle security rule updates and changes in situations where network entities change (e.g., the addition and/or removal of a network entity from the network), as network rules may be defined in a manner that includes or excludes network entities that are added or removed based on their network attributes and relationships with other network entities. Furthermore, changes to a large number of security rules may be implemented by changing a single network rule. Resources, including computing resources and human administrator resources, may be conserved by using a network management device such as the one described herein, e.g., by reducing the amount of time, power, processing resources, memory resources, and/or the like, which might otherwise be used when a network administrator manually manages security rules.

As indicated above, FIGS. 1A and 1B are provided merely as examples. Other examples are possible and may differ from what was described with regard to FIGS. 1A and 1B.

Figure 2:
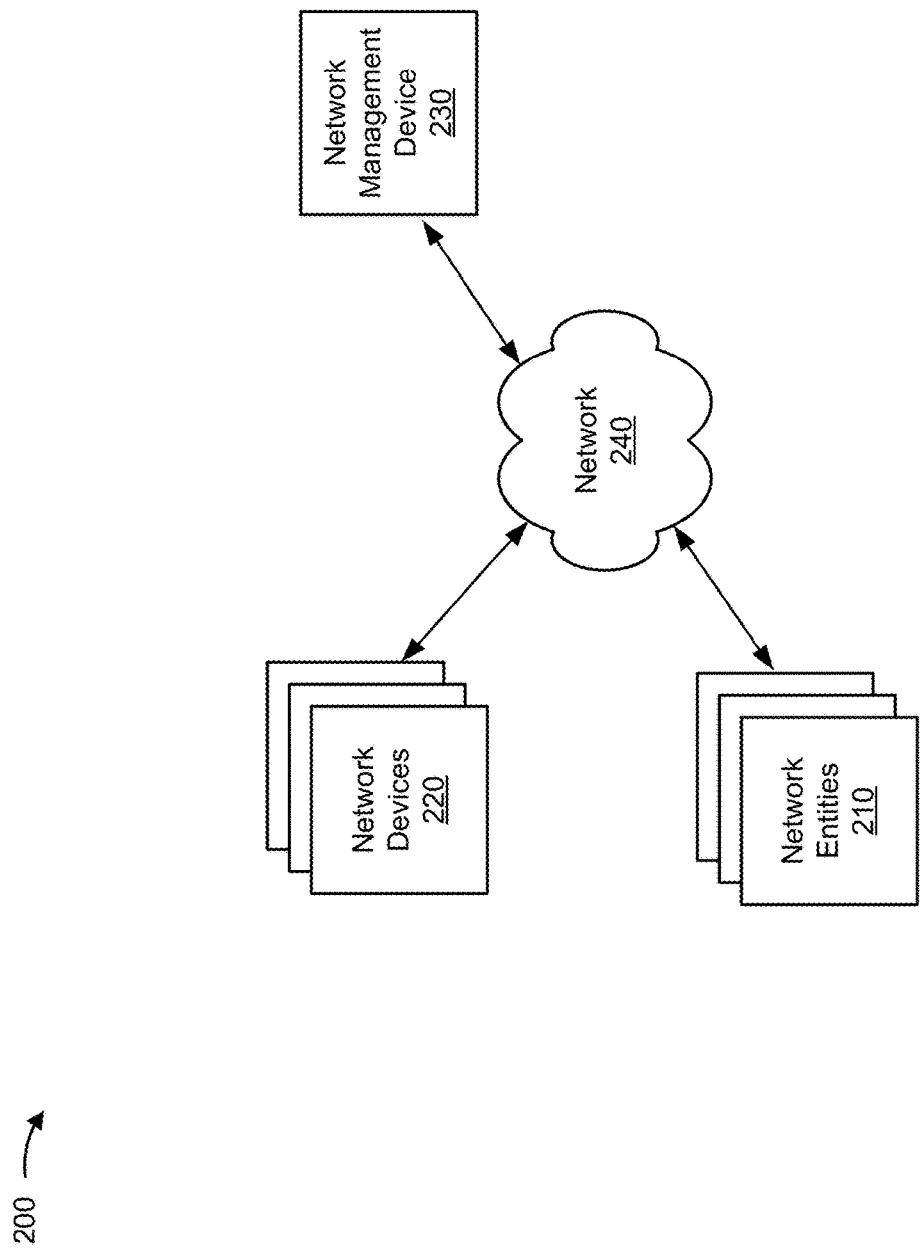
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network entities 210, one or more network devices 220, a network management device 230, and a network 240. Devices of environment 200 may interconnect via wired connections, wireless connections, or a combination of wired and wireless connections.

Network entities 210 include one or more applications and/or one or more devices capable of receiving, generating, storing, processing, and/or providing information associated with network traffic. In some implementations, network entity 210 may include an application, such as a software application implemented by one or more computing devices, a software application deployed in a cloud computing environment, or the like. In some implementations, network entity 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), an IoT device, a personal computer, a server computer, a virtual machine executing on a computer device, or a similar type of device. Network entity 210 may correspond to a variety of attributes that define any number of things relevant to the network entity 210, such as attributes identifying an entity type, an entity identifier, an associated application, an associated organization, a network address, or the like. In some implementations, network entity 210 may include a variety of applications, such as a web browsing application, entertainment application, communications application, or the like, for generating internet protocol packets to be transmitted to and/or received from other devices and/or network entities (e.g., other network entities 210, network devices 220, or the like) via a network (such as network 240).

Network devices 220 include one or more devices capable of receiving, generating, storing, processing, and/or providing information related to network traffic. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may receive network rules and/or security rules and apply the rules to network traffic handled by network device 220. Additionally, or alternatively, network device 220 may perform other actions and/or processes on network traffic, including encryption, decryption, load balancing, security scanning, switching, routing, or the like. In some implementations, network device 220 may be a physical device implemented within a housing, such as a chassis. In some implementations, network device 220 may be a virtual device implemented by one or more computer devices of a cloud computing environment or a data center.

Network management device 230 includes one or more devices capable of receiving, generating, storing, processing, and/or providing information related to network entities. For example, network management device 230 may include a communication and/or computing device, such as a server computer, laptop computer, personal computer, mobile phone, handheld computer, tablet computer, router, gateway, switch, or similar device. In some implementations, network management device 230 includes or otherwise has access to network entity attribute data (e.g., stored by or otherwise accessible to network management device 230) that includes attributes relevant to network entities 210. Network management device 230 may also be able to communicate with network devices 220 (e.g., via network 240) in a manner enabling network management device 230 to provide one or more network devices 220 with network rules and/or security rules to be applied to network traffic associated with network entities 210. For example, network management device 230 may include an application enabling network management device 230 to push security rules to network devices 220 in a manner that causes the network devices 220 to apply the security rules to network traffic traversing the network devices 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
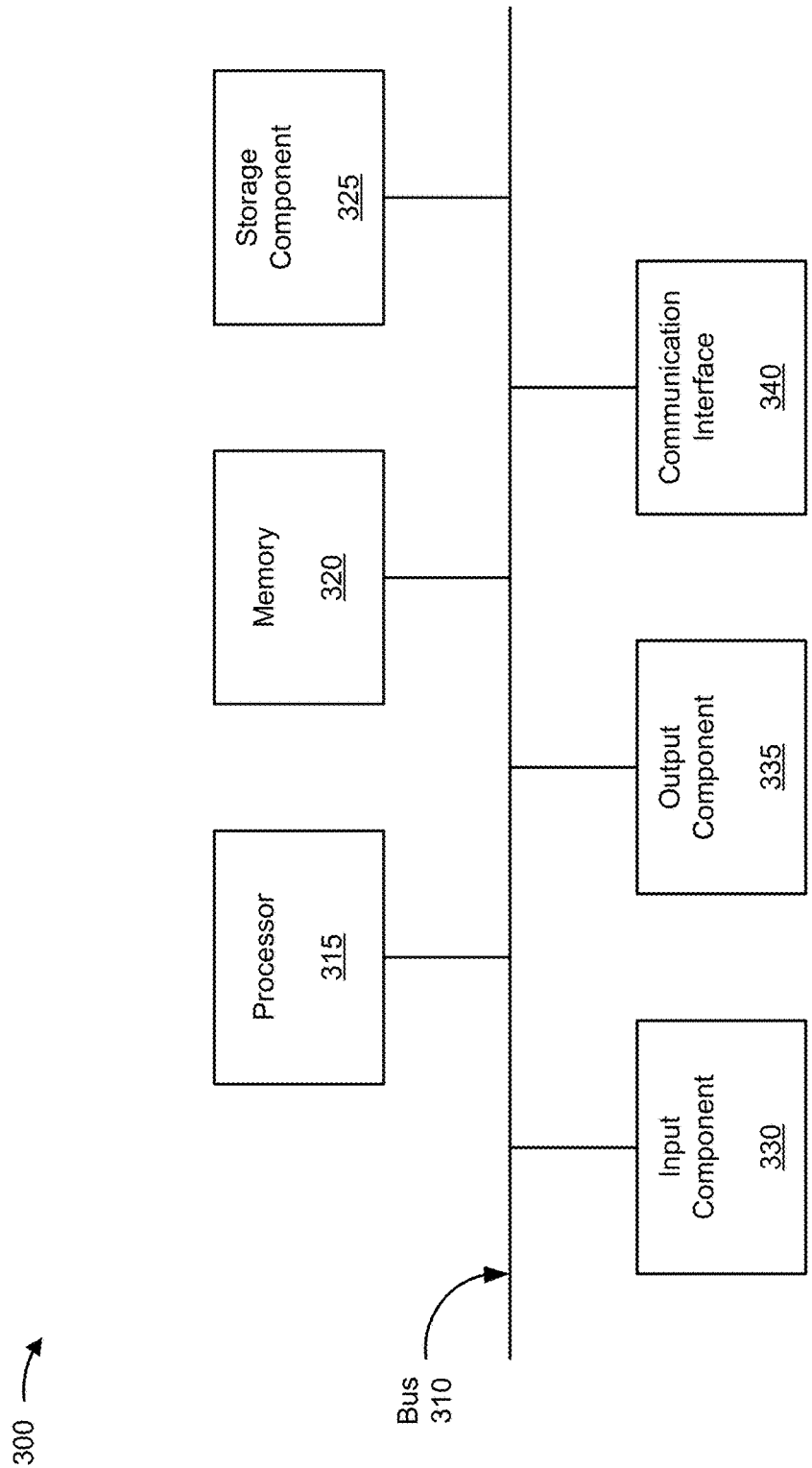
FIG. 3A is a diagram of example components of one or more devices of FIG. 2.

FIG. 3A is a diagram of example components of a device 300. Device 300 may correspond to a network entity 210, network device 220, and/or network management device 230. In some implementations, network entity 210, network device 220, and/or network management device 230 may include one or more devices 300 and/or one or more components of device 300. As shown in FIG. 3A, device 300 may include a bus 310, a processor 315, a memory 320, a storage component 325, an input component 330, an output component 335, and a communication interface 340.

Bus 310 includes a component that permits communication among the components of device 300. Processor 315 is implemented in hardware, firmware, or a combination of hardware and software. Processor 315 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 315 includes one or more processors capable of being programmed to perform a function. Memory 320 includes a random access memory (RAM), a read only memory (ROM), and/or another type of dynamic or static storage device (e.g., a flash memory, a magnetic memory, and/or an optical memory) that stores information and/or instructions for use by processor 315.

Storage component 325 stores information and/or software related to the operation and use of device 300. For example, storage component 325 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 330 includes a component that permits device 300 to receive information, such as via user input (e.g., a touch screen display, a keyboard, a keypad, a mouse, a button, a switch, and/or a microphone). Additionally, or alternatively, input component 330 may include a sensor for sensing information (e.g., a global positioning system (GPS) component, an accelerometer, a gyroscope, and/or an actuator). Output component 335 includes a component that provides output information from device 300 (e.g., a display, a speaker, and/or one or more light-emitting diodes (LEDs)).

Communication interface 340 includes a transceiver-like component (e.g., a transceiver and/or a separate receiver and transmitter) that enables device 300 to communicate with other devices, such as via a wired connection, a wireless connection, or a combination of wired and wireless connections. Communication interface 340 may permit device 300 to receive information from another device and/or provide information to another device. For example, communication interface 340 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 315 executing software instructions stored by a non-transitory computer-readable medium, such as memory 320 and/or storage component 325. A computer-readable medium is defined herein as a non-transitory memory device. A memory device includes memory space within a single physical storage device or memory space spread across multiple physical storage devices.

Software instructions may be read into memory 320 and/or storage component 325 from another computer-readable medium or from another device via communication interface 340. When executed, software instructions stored in memory 320 and/or storage component 325 may cause processor 315 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
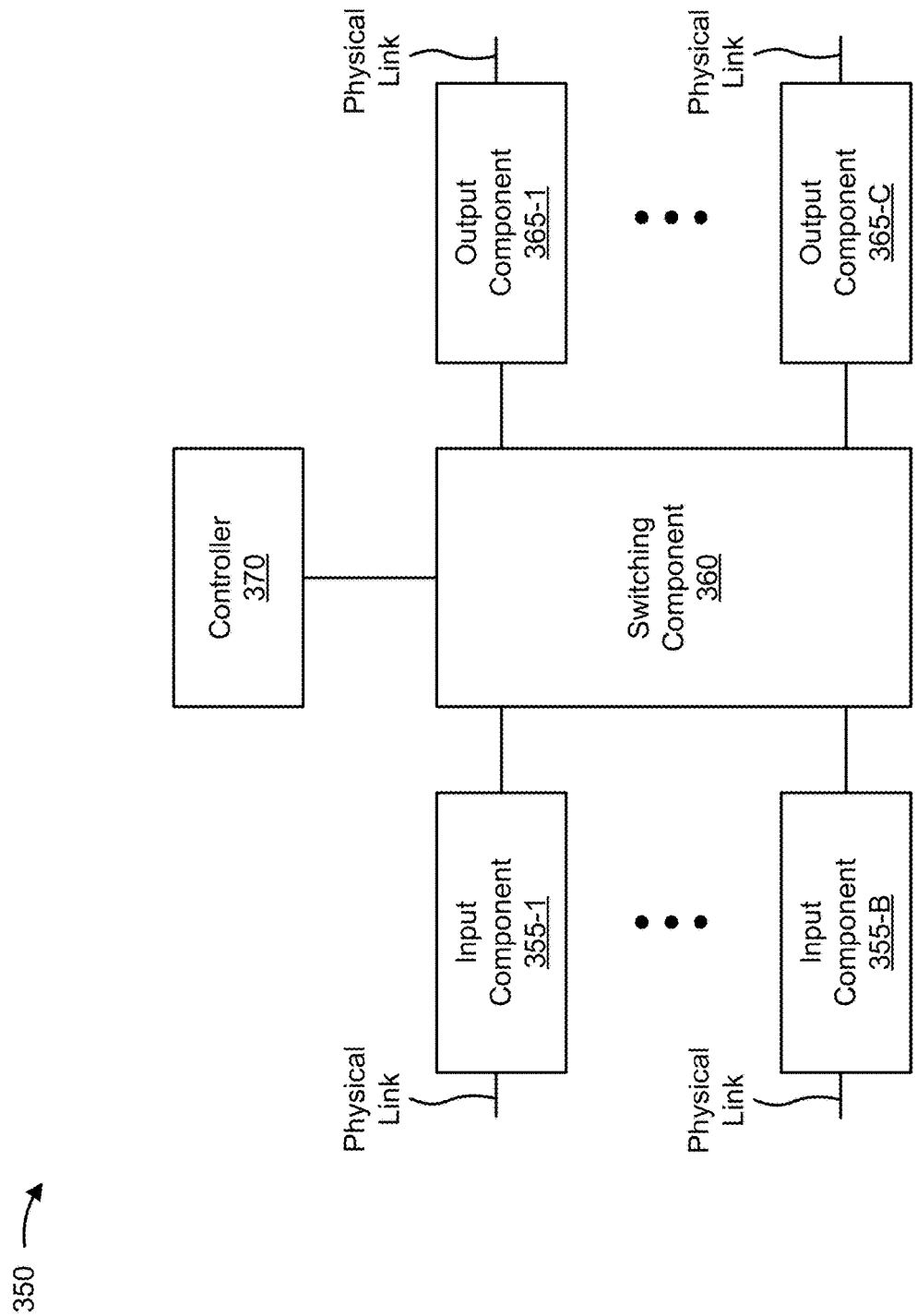
FIG. 3B is a diagram of example components of a device, such as one or more devices of FIG. 2.

FIG. 3B is a diagram of example components of a device, such as one or more devices of FIG. 2. Device 350 may correspond to a network entity 210, network device 220, and/or network management device 230. In some implementations, a network entity 210, network device 220, and/or network management device 230 may include one or more devices 350 and/or one or more components of device 350. As shown in FIG. 3B, device 350 may include one or more input components 355-1 through 355-B (B≥1) (hereinafter, and with respect to FIG. 3B, referred to collectively as input components 355, and individually as input component 355), a switching component 360, one or more output components 365-1 through 365-C (C≥1) (hereinafter, and with respect to FIG. 3B, referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, a FPGA, an ASIC, and/or another type of processor. As indicated above, a processor is implemented in hardware, firmware, or a combination of hardware and software. In some implementations, controller 370 may include one or more processors that can be programmed to perform a function.

In some implementations, controller 370 may include a random access memory (RAM), a read only memory (ROM), and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 350 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350. In some implementations, various components of FIGS. 3A and 3B may be interchangeable in some devices, such as device 300 and/or device 350.

FIG. 4 is a flow chart of an example process 400 for managing network traffic based on network entity attributes. In some implementations, one or more process blocks of FIG. 4 may be performed by network management device 230. In some implementations, one or more process blocks of FIG. 4 may be performed by another device or a group of devices separate from or including network management device 230, such as one or more network entities 210 and/or one or more network devices 220.

As shown in FIG. 4, process 400 may include receiving network entity data indicating network entity attributes associated with network entities (block 410). For example, network management device 230 may receive (e.g., via input component 330 of FIG. 3A or input component 355 of FIG. 2B) network entity data from a network entity 210 and/or a network entity data storage device included in or otherwise in communication with network management device 230. A network entity attribute may include any information relevant to a network entity 210, such as a description of the network entity 210, a network entity type, an application to which the network entity 210 may be applicable, a network address of the network entity 210, a parent application applicable to the network entity 210, a department associated with the network entity 210, an operating system associated with the network entity 210, a host device associated with the network entity 210, a geographic location associated with the network entity 210, a customer identifier associated with the network entity 210, a deployment zone (e.g., development, staging, production, or the like) associated with the network entity 210, a user associated with the network entity 210, a user group associated with the network entity 210, a communications protocol associated with the network entity 210, or the like. In some implementations, a network entity attribute may be any attribute that a network administrator determines should be managed for a network entity 210.

In some implementations, the network entity data be obtained or may have been previously obtained in a variety of ways. For example, network management device 230 may have previously requested network entity data from network entities 210 and/or other devices in communication with network entities 210, such as network devices 220. In some implementations, network entities 210 may include some of the network entity attributes in network traffic provided by the network entities 210, which may enable network management device 230 (e.g., using network devices 220) to obtain network entity attributes using network traffic monitoring (e.g., identifying network entity attributes that may be included in header data of network packets transmitted to or by network entities 210). In some implementations, the network entity data may be provided by a third party, such as a third party device designed to obtain network entity attributes, a network administrator, or the like. In some implementations, network management device 230 may derive one or more network entity attributes from other data associated with network entities 210. For example, based on an IP address associated with a network entity, network management device 230 may determine a geographic location associated with the network entity 210 and a host device associated with the network entity 210 (e.g., by querying the network entity 210 or requesting data from a database storing information associated with the network entity 210).

In this way, network management device 230 may receive network entity data indicating network entity attributes associated with network entities 210, enabling network management device 230 to generate a map of network entities 210 based on the network entity data associated with the network entities 210.

As further shown in FIG. 4, process 400 may include generating a map of network entities based on the network entity data associated with the network entities (block 420). For example, network management device 230 (e.g., processor 315 of FIG. 3A or controller 370 of FIG. 3B) may generate a map of network entities based on the network entity data associated with the network entities 210. In some implementations, the map of network entities may include a data structure that includes information defining relationships between network entities 210.

The relationships between network entities 210 may be identified and included in the map in a variety of ways. For example, relationships between entities may depend upon the network entity attributes available, default relationships identified by network management device 230, and/or relationships specified by a third party, such as a network administrator.

In some implementations, network management device 230 may include or otherwise have access to information defining a set of default relationships. For example, network management device 230 may be preconfigured to identify particular relationships and to include the particular relationships in a map of network entities. For example, a common relationship between network entities may include a shared host, and network management device 230 may automatically include, when generating the map of network entities, information identifying which network entities 210 included in the map have a shared host (e.g., assuming information identifying the host of a network entity 210 is included in network entity data). As another example, network management device 230 may automatically include, when generating the map, information identifying which network entities 210 are associated with the same organization and/or department within an organization.

In some implementations, network management device 230 may include, in the map of network entities, data identifying a relationship between entities that is based on information specified by a third party. For example, a network administrator may instruct network management device 230 to include, in the map, data identifying which network entities 210 have the same parent application, data identifying which network entities 210 are associated with the same user group, or the like.

The map may be implemented in a variety of forms. In some implementations, the map may be stored in a data structure enabling lookup, retrieval, modification, or the like. For example, the network management device 230 may store the map in a database of network entity relationship information. This may enable, for example, network management device 230 to obtain, for any given network entity 210, relationship information defining the relationships the given network entity 210 has with each other network entity 210 for which data is included in the map. In addition, network management device 230 may make changes to the map, enabling the map to remain updated with relevant attributes and relationship information. The map may be stored locally (e.g., by network management device 230) or at a remote location, such as a remote network storage device.

In this way, network management device 230 may generate a map of network entities based on the network entity data associated with the network entities 210, enabling network management device 230 to have access to data defining relationships between network entities 210. Access to data defining relationships between network entities 210 may facilitate, for example, the creation of network entity relationship rules that can be applied to network traffic associated with network entities 210.

As further shown in FIG. 4, process 400 may include identifying a network entity relationship rule based on the map of network entities (block 430). For example, network management device 230 (e.g., processor 315 of FIG. 3A or controller 370 of FIG. 3B) may identify one or more network rules based on the map of network entities. Network rules may define actions to be taken on network traffic based on the relationships between network entities associated with the network traffic.

The content of a network rule may vary. In some implementations, a network rule includes criteria for matching traffic information, and one or more security actions to be performed when the network traffic matches the criteria. The criteria for matching traffic information may include information identifying at least one relationship associated with one or more of the network entities 210. The relationship(s) may be identified from the map of network entities. For example, a network criteria that includes only one network relationship may be "source user_group is network_administrators," indicating that a network rule using that criteria should be applied to all network traffic where the source of the network traffic is associated with a network entity 210 in the user group named network_administrators, which may be associated with one or more network entities 210. As another example with four criteria, an example network rule may specify the following relationships: "(source type is app_component AND destination type is app_component) AND ((source app_component AND destination app_component) belongs to parent application)." A network rule using the foregoing network entity relationships as criteria may be applicable to, for example, network traffic between application components where both the source and destination application components are part of the same parent application.

The security actions specified by network rules may also vary. Security actions may include, for example, permitting network traffic, logging network traffic, blocking network traffic, flagging network traffic, quarantining network traffic, storing network traffic for further analysis, or the like. As described below, the security action(s) define the action to be taken when network traffic matches the criteria specified by the network rule.

In some implementations, network rules may include additional information (e.g., information not related to relationships between network entities 210) that may cause the network rule to be applied in certain ways or cause the network rule not to be applied in some situations. For example, a network rule may include conditions for activating the rule that depend on the type of network traffic, communications protocol being used, or the like. Additionally, or alternatively, network rules may include information regarding applicability to certain subsets of network devices 220 (e.g., limiting the application of a network rule to firewall devices in a particular datacenter). Other information may also be used, in addition to or alternatively to relationship information, in network rules.

In some implementations, the network rules may be generated by network management device 230. For example, network management device 230 may automatically determine, based on relationships identified in the map of network entities, network rules that may be applicable for the corresponding network entities 210. By way of example, based on historical network rules used for other networks and/or by other network management devices, network management device 230 may generate one or more network rules specifying that network traffic with network entities 210 associated with a particular country (e.g., a country associated with network security risks) be logged. In some implementations, network management device 230 may have default rules, or preconfigured rules, that may be used to generate network rules in situations where the corresponding relationships exist between network entities 210. For example, network management device 230 may have a default rule that results in creation of a network rule based on the generation of a map that includes data identifying a user group relationship between network entities 210 (e.g., a network rule permitting network communications between network entities 210 that are associated with the same user group).

In some implementations, network rules may be identified based on input provided by a third party. For example a network administrator in communication with network management device 230 may provide a network rule. For example, a network administrator may provide network management device 230 with data causing network management device 230 to implement a network rule that causes network traffic to be permitted between network entities 210 that are components of the same application. In some implementations, the third party may be a third party network rule provider that generates network rules for particular types of network entities 210 and/or relationships between network entities 210. In this situation, network management device 230 may obtain network rules from the third party network rule provider.

In this way, network management device 230 may identify a network rule based on the map of network entities, enabling network management device 230 to take one or more actions based on the network rule.

As further shown in FIG. 4, process 400 may include performing an action based on the network entity relationship rule (block 440). For example, network management device 230 (e.g., processor 315 of FIG. 3A or controller 370 of FIG. 3B) may perform one or more actions based on the network rule. The action or actions taken may include a variety of actions, including, for example, translating the network rule to a security rule or rules, prompting a network administrator regarding the network rule, applying the network rule to one or more network devices 220, logging the network rule, or the like.

For example, in some implementations, network management device 230 may prompt a user for input regarding the network rule. In this situation, network management device 230 may cause display of information regarding confirmation or modification of one or more network rules identified by network management device 230. For example, network management device 230 may cause display of a user prompt to a network administrator (e.g., delivered directly from a peripheral of network management device 230 and/or to a separate device associated with the network administrator), the user prompt requesting confirmation of one or more network rules, enabling the network administrator to approve application of the network rule(s) (e.g., with or without modifications).

In some implementations, network management device 230 may translate the network rule into one or more security rules. For example, using the map of network entities, network management device 230 may generate security rules from the network rule. By way of example, the network rule may specify matching criteria (in terms of network entity relationships) that maps to several network entities 210 for which relationship information is included in the map. For the network entities 210 that match the criteria, network management device 230 may generate one or more security rules. Firewall rules, for example, are a type of security rule that may include a source device identifier (e.g., a source IP address), a destination device identifier (e.g., a destination IP address), and an action to be taken on network traffic matching the source and destination device identifiers (e.g., actions, such as permit, hold, block, log, or the like).

Using the specific example network rule above, with the matching criteria being "source user_group is network_administrators," network management device 230 may identify each network entity 210 that corresponds to that criteria (e.g., by identifying network addresses of each network entity 210 that belongs to the user group named network_administrators, specified in the map of network entities). Assuming that three network entities 210 match the foregoing criteria, network management device 230 may translate the network rule into three security rules (e.g., each security rule permitting network traffic where the source matches one of the network addresses identified as being associated with the network_administrators user group). Using the other specific example network rule above, with the matching criteria being "(source type is app_component AND destination type is app_component AND ((source app_component AND destination app_component) belongs to parent application)," network management device 230 may identify each network entity 210 that corresponds to the foregoing criteria (e.g., by identifying network addresses of each network entity 210 that is an app_component). Assuming two network entities 210 are of the type app_component (e.g., as specified in the map of network entities), and that both of the network entities 210 also belong to the same parent application, network management device 230 may translate the network rule into two security rules (e.g., one security rules for each of the two network entities 210 specifying, for example, that network traffic between the two network entities 210 should be permitted).

In some implementations, network management device 230 may apply the network rule to one or more network devices 220. In some implementations, network management device 230 provides the network rule to one or more network devices 220 (e.g., via network 240), enabling network devices 220 to apply the rules. Providing a network rule to network devices 220 may be performed, for example, in a situation where network devices 220 are capable of applying the network rule (e.g., by translating the network rule into one or more security rules and/or by applying the network rule directly with access to the map of network entities to enable network entity lookup). In some implementations, network management device 230 translates the network rule into one or more security rules prior to providing the security rules to one or more network devices 220. In this situation, network devices 220 may receive security rules in a manner and format designed to enable network devices 220 to directly apply the security rules to network traffic.

In some implementations, network management device 230 may update one or more security rules based on a change associated with one or more network entities 210 or corresponding network entity attributes. For example, in a situation where a network entity 210 is added to or removed from network 240, and the network entity 210 matches criteria of an existing network rule, network management device 230 may generate additional security rules applicable to an added network entity 210, or remove security rules applicable to a removed network entity 210, and provide the updated security rules to network entities 210 that use the updated security rules. Using the specific example network rule above, with the matching criteria being "(source type is app_component AND destination type is app_component) AND ((source app_component AND destination app_component) belongs to parent application)," adding a network entity 210 that meets this criteria may result in the creation of four new security rules, for a total of six security rules applicable to the three corresponding network entities 210 (e.g., bidirectional security rules between the three network entities 210).

In some implementations, network management device 230 may update one or more security rules based on a change associated with a network rule. For example, a change in the criteria for matching a network rule may potentially affect a large number of security rules and/or network devices 220. In this situation, network management device 230 may provide network devices 220 with updated network rules and/or updated security rules determined by translating the changed network rule.

As noted above, network management device 230 may perform other actions based on the network rule, in addition to or as an alternative to the actions described above. In this way, network management device 230 may perform an action based on the network rule, enabling the management of network traffic based on network rules derived from relationships between network entities 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the ability for network management device 230 to generate a map of network entities and enable creation of network rules may greatly simplify the understanding of security rules in use by network devices 220 and greatly reduce the number of security rules that are manually entered and managed. In addition, network rules may automatically handle security rule updates and changes in situations where network entities 210 change (e.g., the addition and/or removal of a network entity 210 from the network), as network rules may be defined in a manner that includes or excludes network entities 210 that are added or removed based on their network attributes and relationships with other network entities 210. Furthermore, changes to a large number of security rules may be implemented by changing a single network rule. Resources, including computing resources and human administrator resources, may be conserved by using network management device 230, e.g., by reducing the amount of time, power, processing resources, memory resources, and/or the like, which might otherwise be used when a network administrator manually manages security rules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, including,
one or more input components; and
one or more processors, implemented at least partially in hardware, to:
receive, via at least one of the one or more input components, network entity data for a plurality of network entities operating on a network,
the network entity data indicating network entity attributes associated with the plurality of network entities;
generate a map of the plurality of network entities based on the network entity data,
the map of the plurality of network entities defining, for each network entity included in the map of the plurality of network entities, a relationship between the network entity and at least one other network entity included in the plurality of network entities,
the relationship indicating, for the network entity and a particular network entity of the at least one other network entity, one of:
the network entity is a component of the particular network entity,
the network entity and the particular network entity comprise components that share a same component type, or
the particular network entity is a component of the network entity;
automatically determine a network entity relationship rule based on the map of the plurality of network entities and based on historical network rules associated with another network,
the network entity relationship rule including:
criteria for matching traffic information, and
one or more security actions to be performed when network traffic matches the criteria; and
perform an action based on the network entity relationship rule,
where the one or more processors, when performing the action based on the network entity relationship rule, are to:
translate the network entity relationship rule into a plurality of security rules using the map of the plurality of network entities.

2. The device of claim 1, where the one or more processors, when translating the network entity relationship rule into the plurality of security rules using the map of the plurality of network entities, are to:
identify, using the map of the plurality of network entities and the network entity relationship rule, at least two network entities of the plurality of network entities; and
include, in at least one of the plurality of security rules, information regarding each of the at least two network entities.

3. The device of claim 1, where the one or more processors are further to:
provide the plurality of security rules to a network device operating on the network to cause the network device to implement the one or more security rules.

4. The device of claim 1, where the one or more processors, when performing the action based on the network entity relationship rule, are to:
provide the network entity relationship rule to a network device operating on the network to cause the network device to implement the network entity relationship rule.

5. The device of claim 1, where the one or more processors, when performing the action based on the network entity relationship rule, are to:
provide data causing a user prompt to display data indicating the network entity relationship rule, and
where the one or more processors are further to:
receive user input based on the user prompt.

6. The device of claim 5, where the one or more processors are further to:
apply the network entity relationship rule to a network device operating on the network based on the user input,
the network device including a firewall, and
the network entity relationship rule indicating one or more security rules applicable to the firewall.

7. The device of claim 1, where the one or more processors are further to:
identify multiple network entities, from the plurality of network entities, based on the criteria for matching traffic information; and
identify device identifiers for the multiple network entities; and
where the one or more processors, when translating the network entity relationship rule into the plurality of security rules, are to:
translate, based on the device identifiers, the network entity relationship rule into respective security rules for the multiple network entities.

8. The device of claim 1, where:
the plurality of security rules includes a particular security rule,
the particular security rule indicating that network traffic between the network entity and the particular network entity is to be permitted.

9. A non-transitory computer-readable medium storing instructions, the instructions comprising:
one or more instructions that, when executed by one or more processors, cause the one or more processors to:
receive network entity data for a plurality of network entities operating on a network,
the network entity data indicating network entity attributes associated with the plurality of network entities;
generate a map of the plurality of network entities based on the network entity data,
the map of the plurality of network entities defining, for each network entity included in the map of the plurality of network entities, a relationship between the network entity and at least one other network entity included in the plurality of network entities,
the relationship indicating, for the network entity and a particular network entity of the at least one other network entity, one of:
the network entity is a component of the particular network entity,
the network entity and the particular network entity comprise components that share a same component type, or
the particular network entity is a component of the network entity;
automatically determine a network entity relationship rule based on the map of the plurality of network entities and based on historical network rules associated with another network,
the network entity relationship rule including:
criteria for matching traffic information, and
one or more security actions to be performed when network traffic matches the criteria;
generate, based on the network entity relationship rule, a plurality of security rules,
each of the plurality of security rules specifying at least one of the plurality of network entities; and
provide the plurality of security rules to a network device operating on the network.

10. The non-transitory computer-readable medium of claim 9, where the network entity attributes identify, for a network entity of the plurality of network entities, one or more of:
a description of the network entity;
a type associated with the network entity;
an application associated with the network entity;
a network address of the network entity;
an organization associated with the network entity;
a host device associated with the network entity;
an operating system associated with the network entity;
a geographic location associated with the network entity;
a user associated with the network entity; or
a user group associated with the network entity.

11. The non-transitory computer-readable medium of claim 9, where the one or more instructions, when executed by the one or more processors, further cause the one or more processors to:
receive data identifying a new network entity operating on the network and associated with the plurality of network entities; and
generate, based on the network entity relationship rule and the new network entity, at least one new security rule.

12. The non-transitory computer-readable medium of claim 11, where the one or more instructions, when executed by the one or more processors, further cause the one or more processors to:
provide the network device with the at least one new security rule.

13. The non-transitory computer-readable medium of claim 9, where the one or more instructions, when executed by the one or more processors, further cause the one or more processors to:
receive data indicating that another particular network entity of the plurality of network entities is no longer operating on the network; and
generate, based on the network entity relationship rule and the plurality of network entities operating on the network, one or more new security rules.

14. The non-transitory computer-readable medium of claim 13, where the one or more instructions, when executed by the one or more processors, further cause the one or more processors to:
provide the network device with data causing the network device to replace the plurality of security rules with the one or more new security rules.

15. A method comprising:
receiving, by a network management device, network entity data for a plurality of network entities operating on a network,
the network entity data indicating network entity attributes associated with the plurality of network entities;
generating, by the network management device, a map of the plurality of network entities based on the network entity data,
the map of the plurality of network entities defining, for each network entity included in the map of the plurality of network entities, a relationship between the network entity and at least one other network entity included in the plurality of network entities,
the relationship indicating, for the network entity and a particular network entity of the at least one other network entity, one of:
the network entity is a component of the particular network entity,
the network entity and the particular network entity comprise components that share a same component type, or
the particular network entity is a component of the network entity;
automatically determining, by the network management device, a network entity relationship rule based on the map of the plurality of network entities and based on historical network rules associated with another network,
the network entity relationship rule including:
criteria for matching traffic information, and
one or more security actions to be performed when network traffic matches the criteria;
generating, by the network management device and based on the network entity relationship rule, a plurality of security rules,
each of the plurality of security rules specifying a firewall rule applicable to at least one of the plurality of network entities; and
providing, by the network management device, the plurality of security rules to a network firewall device operating on the network.

16. The method of claim 15, further comprising:
identifying a change in the network entity relationship rule; and
generating at least one new security rule based on the change in the network entity relationship rule.

17. The method of claim 16, further comprising:
providing the at least one new security rule to the network firewall device.

18. The method of claim 15, where automatically determining the network entity relationship rule comprises:
automatically determining the network entity relationship rule further based on the network entity attributes associated with the plurality of network entities.

19. The method of claim 15, where automatically determining the network entity relationship rule comprises:
automatically determining the network entity relationship rule further based on rule data received from a third party.

20. The method of claim 15, where generating the plurality of security rules comprises:
generating the plurality of security rules based on the criteria for matching traffic information and based on the one or more security actions to be performed when network traffic matches the criteria.

* * * * *